(12) United States Patent
Smith

(10) Patent No.: US 10,099,605 B2
(45) Date of Patent: Oct. 16, 2018

(54) OPTICAL SYSTEM FOR WARNING LIGHT

(71) Applicant: Whelen Engineering Company, Inc., Chester, CT (US)

(72) Inventor: Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 0 days.

(21) Appl. No.: 15/457,129

(22) Filed: Mar. 13, 2017

(65) Prior Publication Data

US 2018/0257551 A1   Sep. 13, 2018

(51) Int. Cl.

| B60Q 1/00 | (2006.01) |
|---|---|
| B60Q 1/52 | (2006.01) |
| F21S 8/10 | (2006.01) |
| F21S 43/31 | (2018.01) |
| F21S 43/20 | (2018.01) |
| F21S 43/40 | (2018.01) |
| F21S 45/47 | (2018.01) |
| F21S 43/14 | (2018.01) |
| F21Y 115/10 | (2016.01) |
| F21Y 113/13 | (2016.01) |

(52) U.S. Cl.
CPC .............. *B60Q 1/52* (2013.01); *F21S 43/14* (2018.01); *F21S 43/26* (2018.01); *F21S 43/31* (2018.01); *F21S 43/40* (2018.01); *F21S 45/47* (2018.01); *F21S 48/215* (2013.01); *F21S 48/2212* (2013.01); *F21S 48/234* (2013.01); *F21S 48/24* (2013.01); *F21S 48/328* (2013.01); *F21Y 2113/13* (2016.08); *F21Y 2115/10* (2016.08)

(58) Field of Classification Search
CPC .... F21S 48/234; F21S 48/2212; F21S 48/215; F21S 48/24; F21S 48/328; F21S 43/31; F21S 43/26; F21S 43/40; F21S 43/14; F21S 45/47; B60Q 1/52
See application file for complete search history.

(56) References Cited

U.S. PATENT DOCUMENTS

| 6,641,284 B2 | 11/2003 | Stopa et al. |
| 7,712,931 B1 | 5/2010 | Smith |
| 9,459,436 B2 | 10/2016 | Smith |

OTHER PUBLICATIONS

International Search Report and Written Opinion dated Apr. 9, 2018 (PCT/US2018/022095).

*Primary Examiner* — Thomas M Sember
(74) *Attorney, Agent, or Firm* — Alix, Yale & Ristas, LLP

(57) ABSTRACT

An LED optical assembly including an LED, a lens, and a reflector. The lens is made up of a light entry surface and a light emission surface rotated about a rotational axis. The reflector has a pair of first reflecting surfaces and a pair of second reflecting surfaces. The first reflecting surfaces are defined by a first curve rotated about the rotational axis. The second reflecting surfaces are defined by a second curve projected along the rotational axis. The lens and reflector cooperate to redirect light emitted by the LED into a vertically collimated wide angle beam of light.

20 Claims, 9 Drawing Sheets

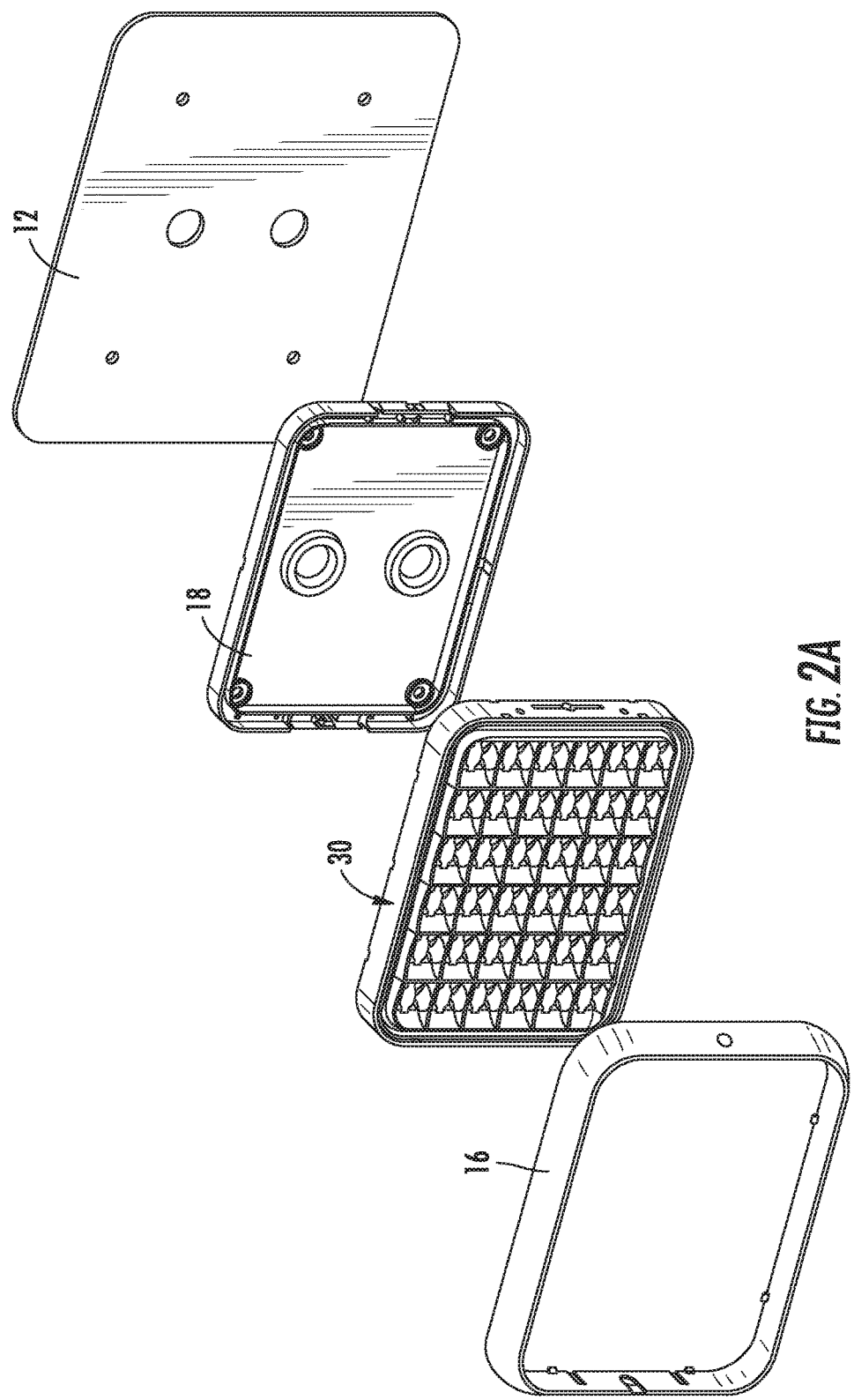

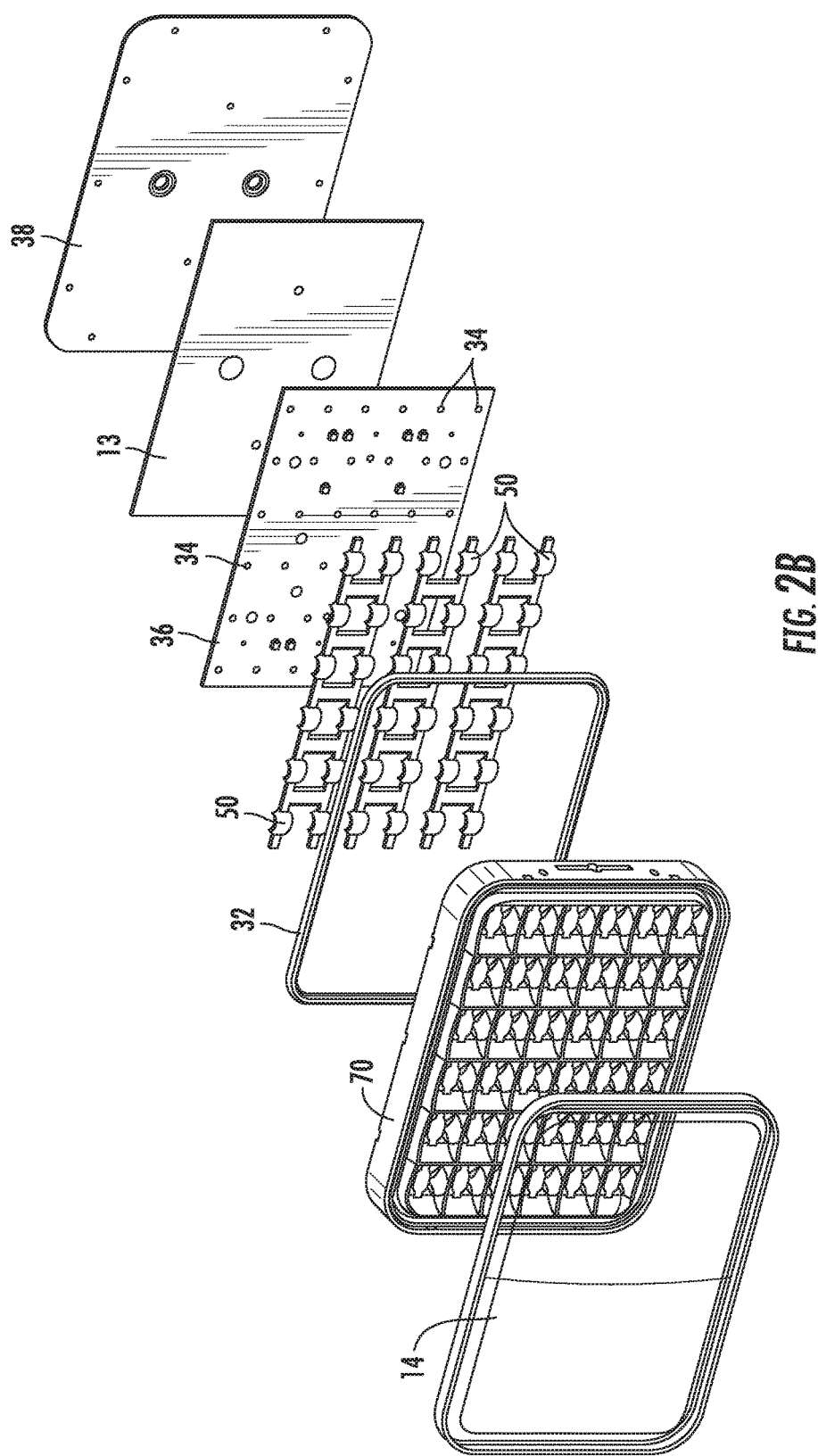

OPTICAL SYSTEM FOR WARNING LIGHT

BACKGROUND

The present disclosure relates generally to optical systems for distributing light from a light source and more particularly to an optical system for redirecting the light output of an LED into a vertically collimated, wide angle beam.

Commercially available LED's have characteristic spatial radiation patterns with respect to an optical axis which passes through the light emitting die. A common characteristic of all of LED radiation patterns is that light is emitted from one side of a plane containing the light emitting die in a pattern surrounding the LED optical axis, which is perpendicular to the plane. Light generated by an LED is radiated within a hemisphere centered on the optical axis. The distribution of light radiation within this hemisphere is determined by the shape and optical properties of the lens (if any) covering the light emitting die of the LED. Thus, LED's can be described as "directional" light sources, since all of the light they generate is emitted from one side of the device.

When designing light sources for a particular purpose, it is important to maximize efficiency by ensuring that substantially all of the generated light is arranged in a pattern or field of illumination dictated by the end use of the device into which the light source is incorporated.

The use of LED's in warning and signaling lights is well known. Older models of LED's produced limited quantities of light over a relatively narrow viewing angle centered on an optical axis of the LED. These LED's were typically massed in compact arrays to fill the given illuminated area and provide the necessary light output. More recently developed, high output LED's produce significantly greater luminous flux per component; permitting fewer LED's to produce the luminous flux required for many warning and signaling applications. It is known to arrange a small number of high-output LED's in a light fixture and provide each high-output LED with an internally reflecting collimating lens. The collimating lens organizes light from the LED into a collimated beam centered on the LED optical axis. Such an arrangement typically does not fill the light fixture, resulting in an undesirable appearance consisting of bright spots arranged against an unlit background. Light-spreading optical features on the outside lens/cover are sometimes employed to improve the appearance of the light fixture. It is also known to create wide angle light emission patterns by modifying the placement of the LEDs relative to the surface on which the light fixture is mounted. Angling or spacing the LEDs relative to a vertical surface can spread the light to be visible from a wide range of vantage points.

This application will discuss optical arrangements for modifying the emitted trajectory of light from an LED with respect to a reference line or plane. For purposes of this application, "collimated" means "re-directed into a trajectory substantially parallel with a reference line or plane." Substantially parallel refers to a trajectory within 5° of parallel with the reference line or plane. When discussing collimation of light with respect to a plane, it will be understood that the component of the emitted trajectory divergent from the reference plane is modified to bring the divergent component of the trajectory within 5° of parallel with the reference plane, while the component of emitted trajectory parallel with the reference plane is not modified. For LEDs mounted to a vertical surface, light is emitted in a hemispherical pattern centered on the optical axes of the LEDs, which are perpendicular to the vertical surface, i.e., the optical axis of each of the LEDs is horizontal. If the LEDs are mounted in a row, the optical axes are included in the same horizontal plane, which is typically the horizontal reference plane. In this situation, "vertically collimated" means that light which would diverge upwardly or downwardly from the horizontal reference plane (containing the LED optical axes) is re-directed into a direction substantially parallel to the horizontal plane. Assuming no other obstruction or change of direction, vertically collimated light from each LED will be dispersed across an arc of approximately 180° in a horizontal direction. The light of adjacent LEDs overlaps to create a horizontal beam having a peak intensity many times the peak intensity of any one of the LEDs.

There is a need in the art for an optical element that redirects the light emitted from an LED into a vertically collimated, horizontally dispersed beam of light. There is a need to accomplish this light dispersion pattern while both filling the light fixture and mounting the light sources in a plane parallel to the mounting surface.

BRIEF SUMMARY OF THE DEVICE

One embodiment of an LED optical assembly according to the disclosure includes a light emitting diode (LED), a lens, and a reflector. The LED includes a light emitting die in a first plane and has an optical axis extending from the light emitting die perpendicular to the first plane. The LED emits light within a hemisphere centered on the optical axis to one side of the first plane. The lens is made up of a light entry surface and a light emission surface rotated about a rotational axis in a second plane. The second plane is perpendicular to the first plane and includes the optical axis. The reflector has a pair of first reflecting surfaces intersecting the second plane and a pair of second reflecting surfaces intersecting a third plane. The first reflecting surfaces are defined by a first curve rotated about the rotational axis. The second reflecting surfaces are defined by a second curve projected along the rotational axis. The third plane includes the optical axis and is perpendicular to the first and second planes.

The light entry surface and said light emission surface cooperate to redirect the light emitted from the LED that is incident on the light entry surface into planes parallel to the third plane. The first reflecting surfaces redirect the light emitted from the LED that is incident on the first reflecting surfaces into planes parallel to the third plane. The second reflecting surfaces redirect the light emitted from the LED that is incident on the second reflecting surfaces into planes parallel to the second plane.

In another embodiment, the LED optical assembly includes a plurality of optical cells each containing an LED, a lens, and a reflector. Each optical cell may have a plurality of LEDs. In some embodiments, the first curve has a first focus including a focal point and the second curve has a second focus including the focal point. This focal point may be at the intersection of the optical axis and the rotational axis.

BRIEF DESCRIPTION OF THE DRAWINGS

FIG. 2A is an isometric exploded view of the optical system used in the warning light assembly of FIG. 1;

FIG. 2B is an isometric exploded view of the warning light assembly of FIG. 1;

DETAILED DESCRIPTION

Embodiments of a compact multi-function lighthead will now be described with reference to the Figures, wherein like numerals represent like parts throughout the FIGS. 1-6B.

Figure 1:
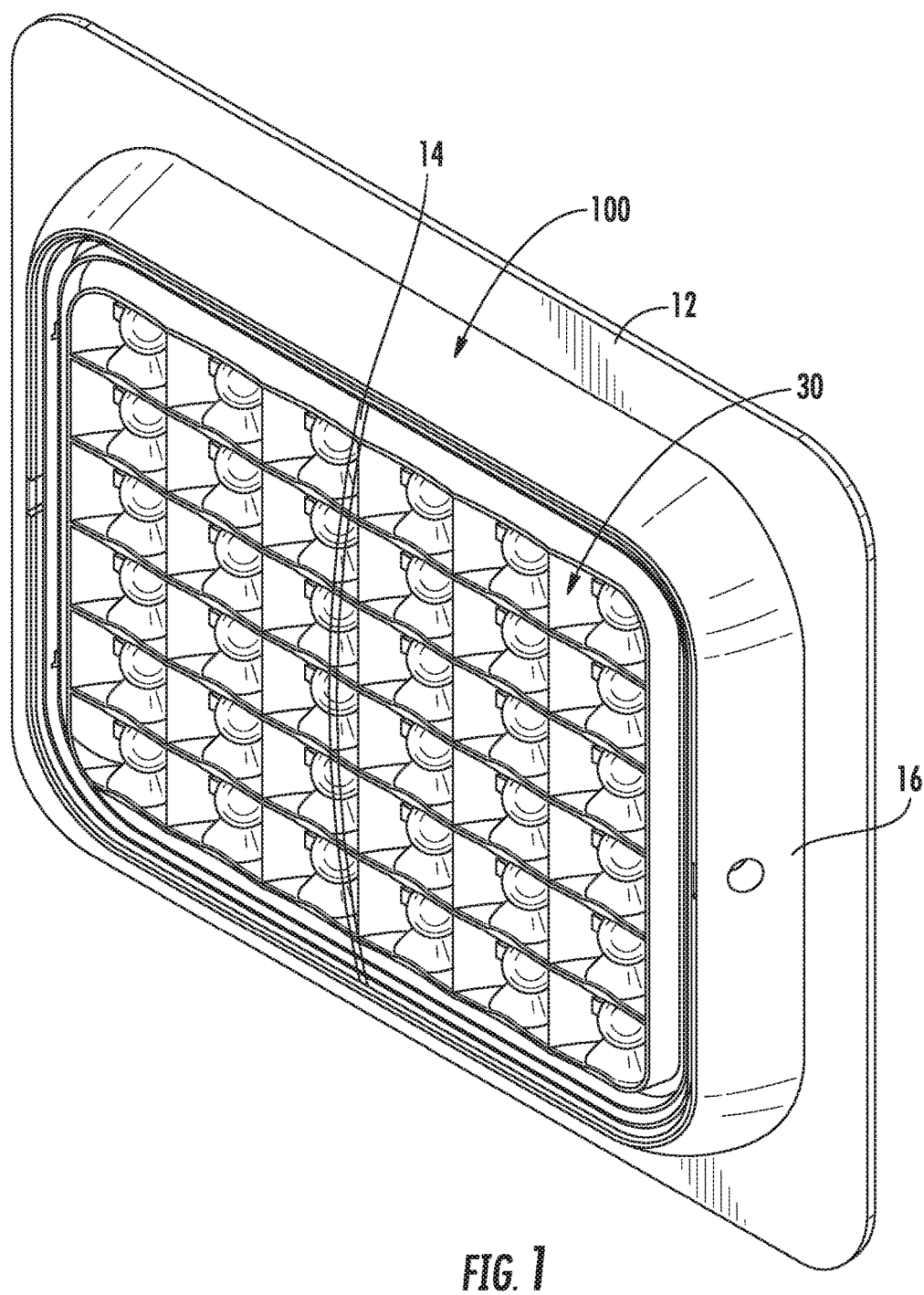
FIG. 1 is an isometric view of a warning light assembly according to aspects of the disclosure.
Figure 3A:
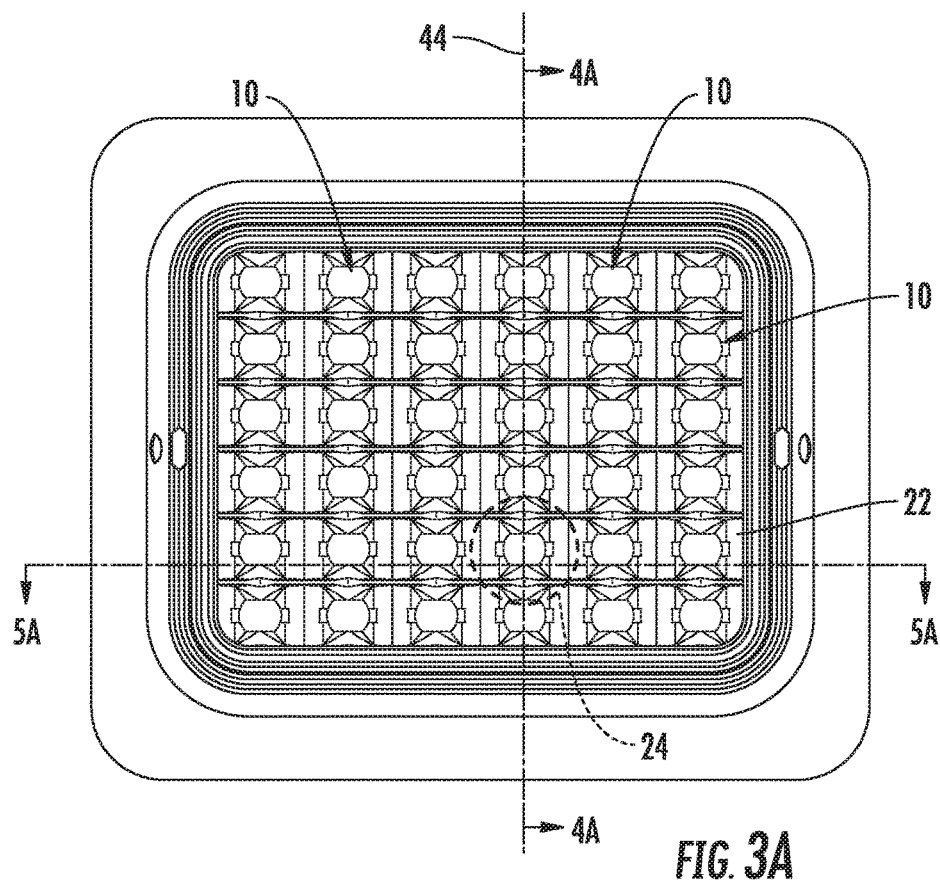
FIG. 3A is a front view of the warning light assembly of FIG. 1.

FIGS. 1-3A illustrate a warning light assembly 100 incorporating the disclosed optical system 10. FIG. 1 shows the warning light assembly 100 secured to a mounting surface 12, which may be the vertical surface of an emergency vehicle such as a fire truck, ambulance, or rescue vehicle. As shown in FIG. 1, the warning light assembly 100 includes a lighthead 30, and a bezel 16 surrounding the lighthead 30. The lighthead 30 includes a rectangular array of 36 optical cells 24, each including at least one LED 34. The optical cells 24 are arranged in a 6×6 grid, as shown in FIG. 3A. Each optical cell 24 includes an optical system 10 to redirect light from at least one LED 34 into a desired light emission pattern.

Figure 3B:
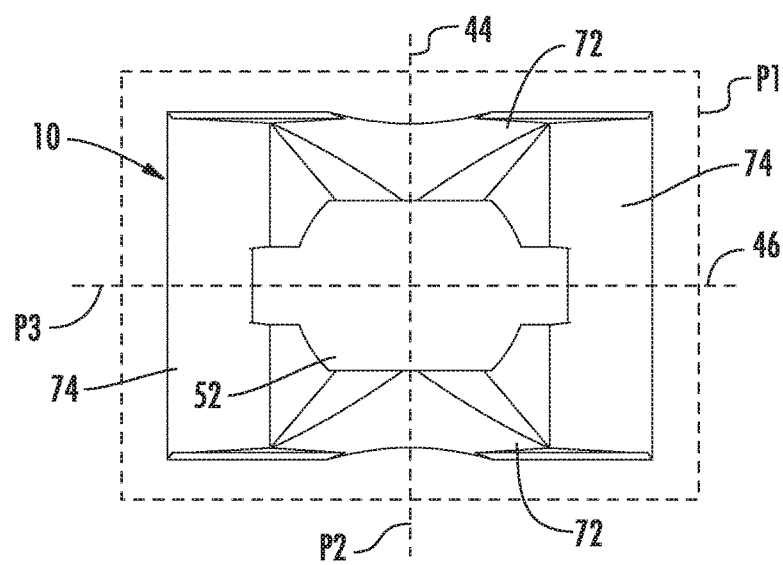
FIG. 3B is a partial view of the optical system surrounded by the dashed line circle in FIG. 3A.

As will be described in greater detail below, the desired light emission pattern is a vertically collimated, wide angle beam. As used in this application, vertically collimated means that light emitted from the LED 34 with trajectories oriented "up" or "down" with respect to the viewer's perspective in FIGS. 3A and 3B, is redirected by refraction and/or reflection into trajectories substantially aligned with a horizontal plane, designated as third plane P3 in FIG. 3B. Light emitted from the LED 34 with trajectories oriented "right" or "left" with respect to the viewer's perspective in FIG. 3A is selectively redirected into trajectories substantially aligned with a vertical plane, designated as second plane P2 in FIG. 3B. A majority of light emitted from each LED 34 having a trajectory divergent from the second plane P2 is not redirected with respect to the second plane P2, while some wide angle light (light having trajectories most widely divergent from the second plane P2) is redirected into trajectories substantially aligned with the second plane P2. The resulting light emission pattern is vertically collimated, with a wide horizontal angular spread, making the warning light visible over a range of positions relative to the emergency vehicle.

Figure 6A:
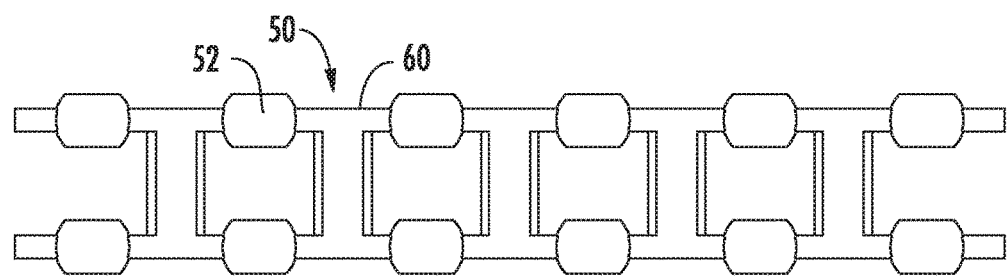
FIG. 6A is a front view of a group of lenses used in the warning light assembly of FIG. 1.
Figure 6B:
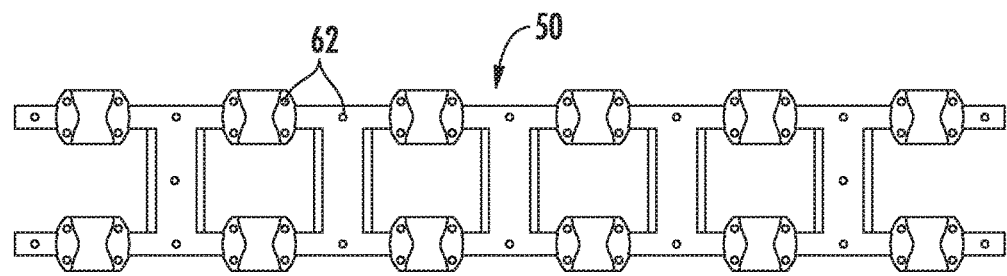
FIG. 6B is a back view of a group of lenses used in the warning light assembly of FIG. 1.

As shown in FIGS. 2A-2B, the lighthead 30 is constructed from a cover 14, reflector 70, seal 32, groups of lenses 50, PC board 36, and heat sink plate 38. As best shown in FIGS. 6A and 6B, the groups of lenses 50 have rearward facing positioning pins 62 that fit into corresponding openings in the front face of the PC board 36 and align each lens 52 relative to the LED 34 for that optical cell 24. In the illustrated embodiment, the heat sink plate 38 includes openings for wires extending rearwardly from the PC board 36, as well as fasteners that extend forward through the PC board 36 to engage the reflector 70. A seal 32 is received in a groove around the back of the reflector 70, and engages the heat sink plate 38 to provide a weather-tight seal surrounding the lenses 52 and PC board 36. A co-therm gasket 13 is sandwiched between the PC board 36 and heat sink plate 38, to electrically insulate the PC board 36 from the aluminum heat sink plate 38, while providing a thermal path from the LEDs 34 to the heat sink plate 38 as is known in the art. The cover 14 includes a rearward facing lip that is received in a corresponding groove of the reflector 70. A bead of adhesive is injected into the groove prior to insertion of the cover lip into the groove. In the illustrated embodiment, the cover 14 includes snap features that engage the reflector 70 to maintain the cover 14 in secured relation to the reflector 70 while the adhesive cures. The fully assembled lighthead 30 provides a sealed enclosure for the PC board 36, groups of lenses 50, and reflector 70.

FIG. 3A depicts the array 22 containing identical optical cells 24, each having an optical system 10. FIG. 3B depicts one optical cell 24 (as surrounded by the dashed line circle in FIG. 3A) in greater detail. Each optical system 10 includes an LED 34 (depicted in FIG. 4B) that emits light through a lens 52 and is surrounded by a pair of first reflecting surfaces 72 above and below the third plane P3 and a pair of second reflecting surfaces 74 to the left and right of the second plane P2. The details of the lens 52 and reflector 70 are analyzed along depicted sectional lines 4-4 and 5-5 in reference to FIGS. 4A-5B below.

Figure 4A:
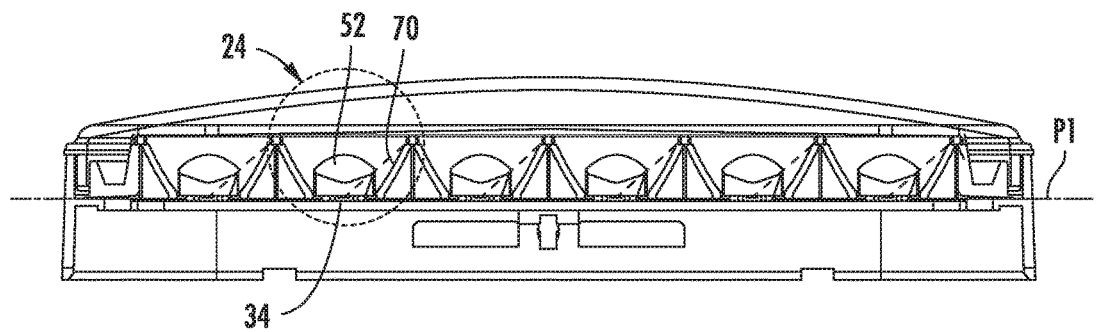
FIG. 4A is a sectional view of the warning light assembly of FIG. 3A taken along line 4-4.

FIG. 4A depicts the cross-section of the lighthead 30 along line 4-4 of FIG. 3A. The lens 52 and reflector 70 are shown in greater detail in FIG. 4B. Each LED 34 has an optical axis 40 and a light emitting die in a first plane P1. The LED 34 emits light within a hemisphere centered on the optical axis 40 on one side of the first plane P1. A focal point 42 is located at the intersection of the optical axis 40 and a rotational axis 44 within the first plane P1. The LEDs 34 are mounted to a PC board 36 which provides power and has thermal pathways to allow heat dissipation into the heat sink plate 38 (not depicted). The PC board 36 is parallel to the first plane P1. The second plane P2 includes the rotational axis 44 and is perpendicular to the first plane P1. The third plane P3 includes the optical axis 40 and is perpendicular to the first and second planes P1, P2.

Figure 4B:
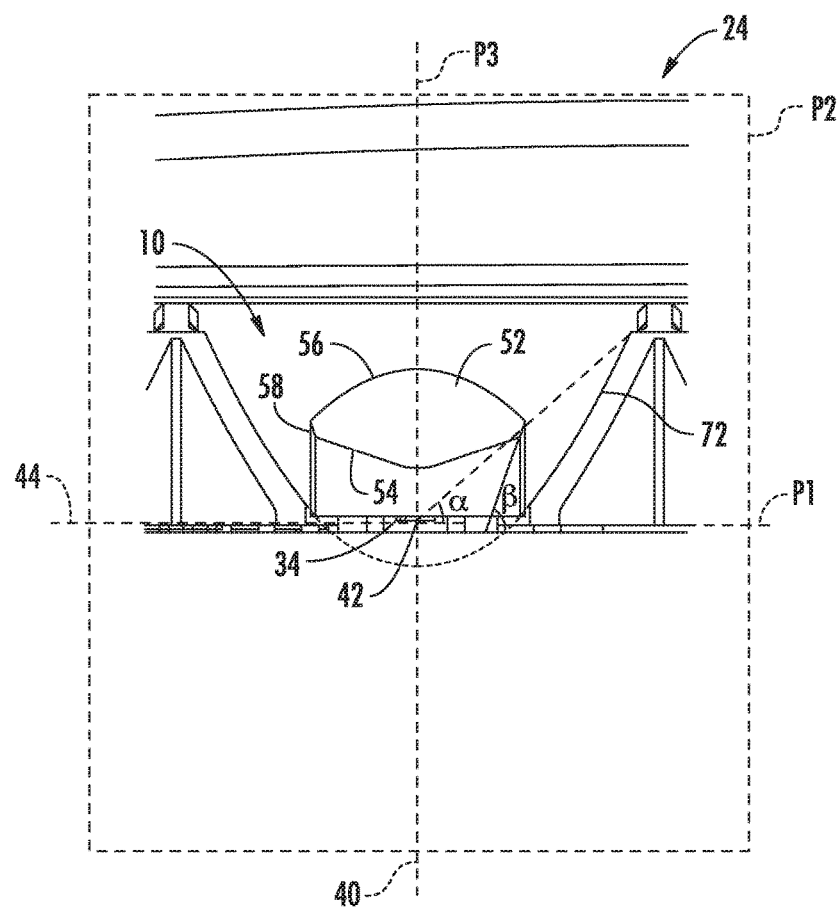
FIG. 4B is a partial view of the optical system surrounded by the dashed line circle in FIG. 4A.

Referring to FIG. 4B, first reflecting surfaces 72 intersect the second plane P2 and are defined by a first curve rotated about the rotational axis 44. In the depicted embodiment, the first curve has a first focus at the focal point 42. Light emitted by the LED 34 less than α° from the rotational axis 44 is redirected by the first reflecting surfaces 72. In the depicted embodiment a is approximately 40°. The lens 52 is defined by light entry surface 54, light emission surface 56, and transition surface 58. In the depicted embodiment, the surfaces combine to form a solid optic rotated about the rotational axis 44. The surfaces 54, 56, 58 of the lens 52 cooperate to eliminate the vertical component of the light emitted by LED 34 incident on the light entry surface 54. The angle β of transition surface 58 relative to rotational axis 44 may match the trajectory of the light refracted through light entry surface 54. In the depicted embodiment, angle β is approximately 68°.

The first reflecting surfaces 72 and lens 52 eliminate the vertical component of the light emitted by LED 34. In other words, the first reflecting surfaces 72 and lens 52 cooperate to redirect the light emitted by the LED 34 into planes parallel with the third plane P3.

Figure 5A:
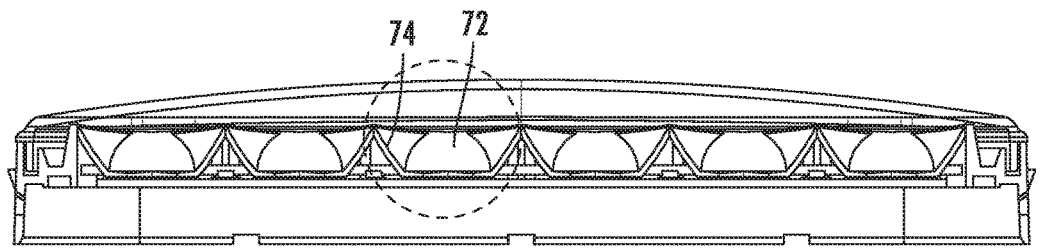
FIG. 5A is a sectional view of the warning light assembly of FIG. 3A taken along line 5-5.
Figure 5B:
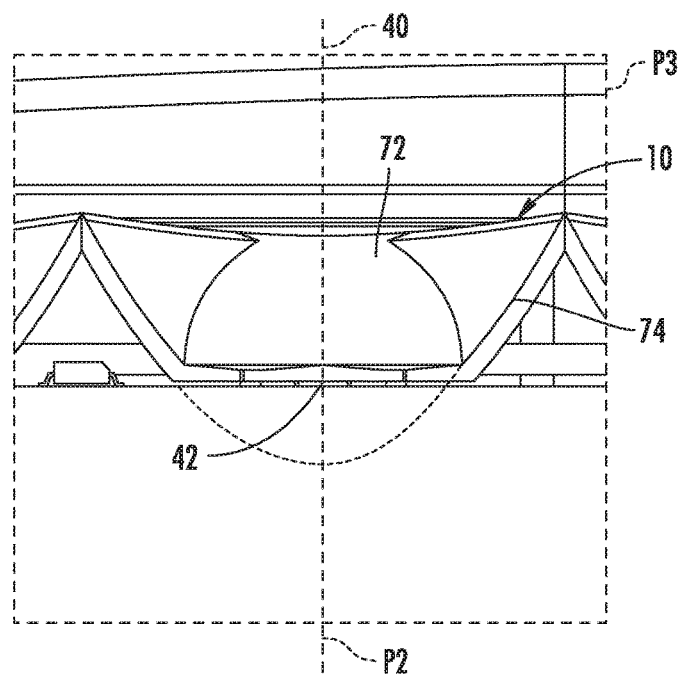
FIG. 5B is a partial view of the optical system surrounded by the dashed line circle in FIG. 5A.

FIG. 5A depicts the cross-section of the lighthead 30 along line 5-5 of FIG. 3A. The first reflecting surfaces 72 and second reflecting surfaces 74 are clearly visible in this view and are shown in greater detail in FIG. 5B. The second reflecting surfaces 74 intersect the third plane P3 and are defined by a second curve. The second curve is projected along the rotational axis 44 to form the second reflecting surfaces 74. In the depicted embodiment, the second curve has a second focus coincident with the focal point 42. The second reflecting surfaces 74 redirect light refracted by lens 52 or reflected by first reflecting surfaces 72 into planes substantially parallel to the second plane P2. As previously discussed, light refracted by lens 52 or reflected by first reflecting surfaces 72 is redirected into planes parallel to the third plane P3. As a result, light emitted from LED 34 that is ultimately reflected by the second reflecting surfaces 74 is generally collimated with respect to optical axis 40.

Referring to FIGS. 6A and 6B, the groups of lenses 50 contain a plurality of lenses 52 connected by braces 60. The depicted lighthead 30 assembles three separate groups of lenses 50 to redirect light from the plurality of LEDs 34 on the PC board 36. The braces 60 connect the lenses 52 to one another and secure the groups of lenses 50 between the reflector 70 and the PC board 36 (as depicted in FIGS. 4A and 5A). Pins 62 on the back of the groups of lenses 50 engage complementary holes in PC board 36 and locate the lenses 52 relative to the LEDs 34.

The depicted embodiment has a single LED in each cell 24. In other embodiments, each cell 24 contains three separate LEDs 34 with optical axes 40 along a focal axis 46, within the first and third planes P1, P3. The three LEDs 34 may emit light of different color. As a result of the plurality of LEDs in each optical cell, only one LED can have an optical axis 40 including the focal point 42. Each optical cell 24 of the array 22 could have the same color LED with the optical axis 40 including the focal point 42 or adjacent groups of cells could alternate LED positions to balance each color, resulting in a substantially similar light dispersion pattern for each color of LED.

In the depicted embodiment, no light exits the lighthead 30 without redirection by at least one of the lenses 52, the first reflecting surfaces 72, or the second reflecting surfaces 74. The reflecting surfaces 72, 74 and lenses 52 cooperate to create a light dispersion pattern that fills the bezel 16 and is a vertically collimated, wide angle beam. Either angle α or β may be different without significantly departing from the scope of this disclosure. This may allow light to escape the lighthead 30 without redirection.

Figure 7:
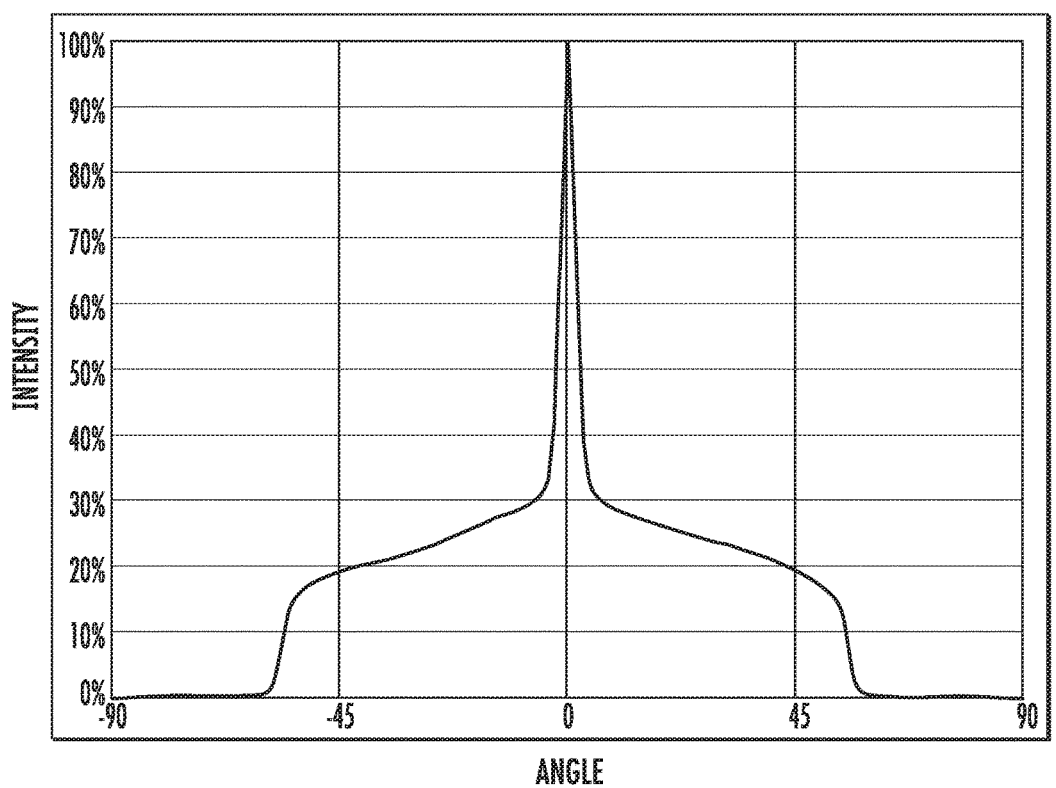
FIG. 7 is a graphical representation of the horizontal light emission pattern of an optical cell of FIG. 3A.
Figure 8:
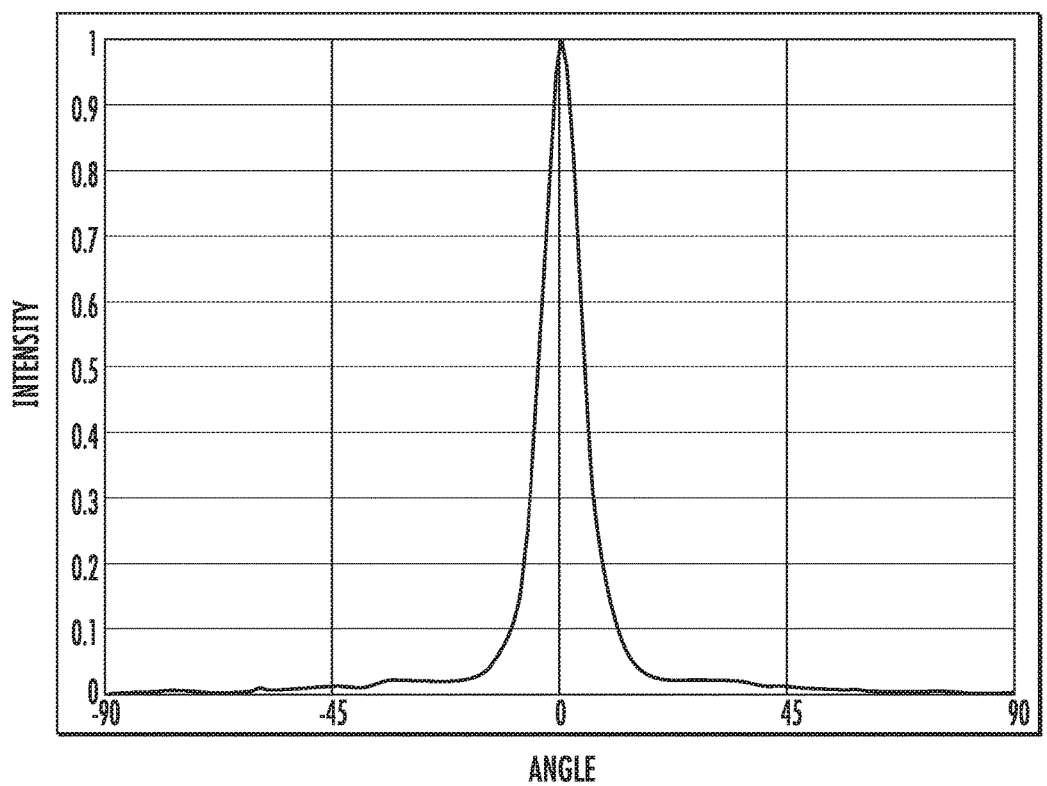
FIG. 8 is a graphical representation of the vertical light emission pattern of an optical cell of FIG. 3A.

FIGS. 7 and 8 graphically represent the light emission pattern from the optical cell 24 in the horizontal and vertical directions, respectively. The graphs show a vertically collimated light dispersion pattern with a wide horizontal angular spread. The horizontal dispersion allows adjacent cells 24 to form a continuous horizontal band of light that minimizes bright spots in the lighthead 30.

FIG. 7 shows the horizontal dispersion into a wide angle beam of light. When graphically presented, the beam formed in the horizontal direction has much more light emitted over a range of angles diverging up to about 48° relative to optical axis 40. The emission pattern in the horizontal direction from LED 34 through optical system 10 results in a wide angle light emission with a strong emission aligned with the second plane P2.

FIG. 8 shows the vertical collimation corresponding to a roughly 15° vertically collimated beam relative to a center line at 0° coincident with the third plane P3. Alternatively stated, the emission pattern from LED 34 through optical system 10 results in a beam where substantially all the light is emitted at an angle of 15° or less relative to the third plane P3 in the vertical direction. The greatest intensity of the beam generated by optical cell 24 in the vertical direction is at the center of the emission pattern, which resembles a relatively sharp, narrow spike aligned with the second and third planes P2, P3 when presented graphically.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. An LED optical assembly comprising:
   a light emitting diode (LED) comprising a light emitting die in a first plane and having an optical axis extending from the light emitting die perpendicular to the first plane, said LED emitting light within a hemisphere centered on the optical axis on one side of the first plane;
   a lens having a light entry surface and a light emission surface rotated about a rotational axis in a second plane perpendicular to the first plane and including the optical axis; and
   a reflector having a pair of first reflecting surfaces intersecting the second plane and a pair of second reflecting surfaces intersecting a third plane, said first reflecting surfaces defined by a first curve rotated about the rotational axis, said second reflecting surfaces defined by a second curve projected along the rotational axis, and the third plane includes the optical axis and is perpendicular to the first and second planes;
   wherein said light entry surface and said light emission surface cooperate to redirect the light emitted from said LED incident with said light entry surface into planes parallel to the third plane, said first reflecting surfaces redirect the light emitted from said LED incident with said first reflecting surfaces into planes parallel to the third plane, and said second reflecting surfaces redirect the light emitted from said LED incident with said second reflecting surfaces into planes parallel to the second plane.

2. The LED optical assembly of claim 1, wherein the light redirected by said second reflecting surfaces is substantially collimated with respect to the optical axis.

3. The LED optical assembly of claim 1, further comprising a plurality of optical cells each containing an LED, a lens, and a reflector.

4. The LED optical assembly of claim 3, wherein each optical cell has a plurality of LEDs.

5. The LED optical assembly of claim 4, wherein said plurality of LEDs emit light of at least two distinct colors in each optical cell and are arranged in an order with optical axes extending perpendicular from a focal axis.

6. The warning light of claim 5, wherein the order of said plurality of LEDs along the focal axis in adjacent optical cells is different.

7. The LED optical assembly of claim 4, wherein said plurality of LEDs are arranged to emit a first light emission pattern or a second light emission pattern, said first light emission pattern redirects substantially all of the light emitted from said LEDs into trajectories parallel with the optical axis and said second light emission pattern redirects substantially all of the light emitted from said LEDs into planes parallel to the third plane.

8. The LED optical assembly of claim 1, wherein said first curve has a first focus including a focal point, said second curve has a second focus including the focal point, and the focal point is at the intersection of the optical axis and the rotational axis.

9. A warning light comprising:
a plurality of adjacent cells, each containing at least one LED, a lens, and a reflector;
said LED comprising a light emitting die in a first plane and having an optical axis extending from the light emitting die perpendicular to the first plane, said LED emitting light within a hemisphere centered on the optical axis on one side of the first plane;
said lens having a light entry surface and a light emission surface rotated about a rotational axis in a second plane perpendicular to the first plane and including the optical axis; and
said reflector having a pair of first reflecting surfaces and a pair of second reflecting surfaces, said first reflecting surfaces defined by a first curve rotated about the rotational axis and said second reflecting surfaces defined by a second curve projected along the rotational axis;
wherein said lens and said reflector cooperate to redirect the light emitted from said LED into planes parallel to the second plane.

10. The warning light of claim 9, wherein the light redirected by said second reflecting surfaces is substantially collimated with respect to the optical axis.

11. The warning light of claim 9, further comprising a plurality of LEDs in each cell.

12. The warning light of claim 11, wherein said plurality of LEDs emit light of at least two distinct colors in each cell and are arranged in an order with optical axes extending perpendicular from a focal axis.

13. The warning light of claim 12, wherein the order of said plurality of LEDs along the focal axis in adjacent cells is different.

14. The warning light of claim 9, wherein the light emitted from said LED is redirected to substantially fill said cell.

15. The warning light of claim 9, further comprising a plurality of LEDs in each cell arranged to emit a first light emission pattern or a second light emission pattern;
wherein said first light emission pattern redirects substantially all of the light emitted from said LEDs into trajectories parallel with the optical axis and said second light emission pattern redirects substantially all of the light emitted from said LEDs into planes parallel to the second plane.

16. An LED optical assembly comprising:
a plurality of light emitting diodes (LEDs), each comprising a light emitting die in a first plane and having an optical axis extending from the light emitting die perpendicular to the first plane, said LED emitting light within a hemisphere centered on the optical axis on one side of the first plane, each optical axis arranged on a focal axis in the first plane;
a lens having a light entry surface and a light emission surface rotated about a rotational axis in a second plane perpendicular to the first plane and including the optical axis; and
a reflector having a pair of first reflecting surfaces intersecting the second plane and a pair of second reflecting surfaces intersecting a third plane, said third plane perpendicular to the first and second planes and including the optical axis, said first reflecting surfaces defined by a first curve rotated about the rotational axis, said second reflecting surfaces defined by a second curve projected along the rotational axis;
wherein said light entry surface and said light emission surface cooperate to redirect the light emitted from said LEDs incident with said light entry surface into planes parallel to the third plane, said first reflecting surfaces redirect the light emitted from said LED incident with said first reflecting surfaces into planes parallel to the third plane, and said second reflecting surfaces redirect the light emitted from said LEDs incident with said second reflecting surfaces into planes parallel to the second plane.

17. The LED optical assembly of claim 16, wherein the light redirected by said second reflecting surfaces is substantially collimated with respect to the optical axis.

18. The LED optical assembly of claim 16, wherein said first curve has a first focus including a focal point, said second curve has a second focus including the focal point, and the focal point is at the intersection of the optical axis and the rotational axis.

19. The LED optical assembly of claim 16, wherein said plurality of LEDs emit light of at least two distinct colors.

20. The LED optical assembly of claim 16, wherein said plurality of LEDs are arranged to emit a first light emission pattern or a second light emission pattern, said first light emission pattern redirects substantially all of the light emitted from said LEDs into trajectories parallel with the optical axis and said second light emission pattern redirects substantially all of the light emitted from said LEDs into planes parallel to the third plane.

* * * * *